United States Patent
Knittel

(10) Patent No.: US 8,593,917 B2
(45) Date of Patent: Nov. 26, 2013

(54) HIGH DATA DENSITY OPTICAL RECORDING MEDIUM

(75) Inventor: Joachim Knittel, Tuttlingen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/925,740

(22) Filed: Oct. 28, 2010

(65) Prior Publication Data

US 2011/0103216 A1 May 5, 2011

(30) Foreign Application Priority Data

Oct. 30, 2009 (EP) .................................... 09306040

(51) Int. Cl.
*G11B 7/24* (2006.01)
*G11B 7/00* (2006.01)

(52) U.S. Cl.
USPC ..................... 369/13.55; 369/111; 369/275.4; 369/280; 369/275.1

(58) Field of Classification Search
USPC .................. 369/280, 94, 92, 286, 288, 13.55, 369/53.14, 93, 276, 277, 275.4, 275.1, 369/44.13, 44.18, 47.37, 111; 359/649–651; 216/11
See application file for complete search history.

(56) References Cited

U.S. PATENT DOCUMENTS

| | | | |
|---|---|---|---|
| 3,800,099 A * | 3/1974 | Dickopp et al. | 369/16 |
| 4,842,824 A | 6/1989 | Ono | |
| 4,856,108 A * | 8/1989 | Tinet | 369/44.26 |
| 5,754,514 A | 5/1998 | Guerra | |
| 6,570,826 B2 * | 5/2003 | Hosokawa | 369/13.55 |
| 7,339,710 B2 * | 3/2008 | Chuang | 359/3 |
| 2002/0154590 A1 | 10/2002 | Vezenov et al. | |
| 2006/0203629 A1 | 9/2006 | Lee et al. | |
| 2006/0245342 A1 | 11/2006 | Miura | |
| 2008/0062843 A1 * | 3/2008 | Neijzen et al. | 369/92 |
| 2008/0165652 A1 * | 7/2008 | Misawa et al. | 369/94 |
| 2008/0310265 A1 * | 12/2008 | Senno et al. | 369/47.14 |
| 2009/0109828 A1 | 4/2009 | Wang et al. | |
| 2010/0134897 A1 | 6/2010 | Lee et al. | |

FOREIGN PATENT DOCUMENTS

| | | |
|---|---|---|
| DE | 10116110 | 10/2002 |
| EP | 1022733 | 7/2000 |

OTHER PUBLICATIONS

Zhang et al., "Superlenses to Overcome the Diffraction Limit", Nature Materials, vol. 7, Jun. 30, 2008, pp. 435-441.

* cited by examiner

*Primary Examiner* — Wayne Young
*Assistant Examiner* — Dionne Pendleton
(74) *Attorney, Agent, or Firm* — Myers Wolin LLC

(57) ABSTRACT

The present invention relates to a high data density optical recording medium. The invention further relates to an apparatus for reading from such an optical recording medium. The optical recording medium has marks that are arranged in tracks. The tracks have a cross section with a curved shape and protrude above a surface of the optical recording medium.

10 Claims, 4 Drawing Sheets

HIGH DATA DENSITY OPTICAL RECORDING MEDIUM

This application claims the benefit, under 35 U.S.C. §119 of EP Patent Application 09306040.8 filed 30 Oct. 2009.

The present invention relates to a high data density optical recording medium. The invention further relates to a method and an apparatus for reading from such an optical recording medium, and to a method for mastering such an optical recording medium.

There is a general need for high data density optical recording media. One possibility to increase the data density is to use physical effects that allow to reach a resolution beyond the diffraction limit of the reading light.

For example, a so-called super-resolution near field structure (Super-RENS) can be placed directly above a data layer of the optical recording medium, which significantly reduces the effective size of a light spot used for reading from and/or writing to the optical recording medium. Optical recording media with such a Super-RENS structure offer the possibility to increase the data density by a factor of 3 to 4 in one dimension compared to a regular optical recording medium. Super-RENS structures formed of a metal oxide or a polymer compound for recording of data and a phase change layer formed of a GeSbTe or a AgInSbTe based structure for reproducing of data are known from WO 2005/081242 and US 2004/0257968, respectively. A further example of a super-RENS structure is described in WO 2004/032123.

Figure 1:
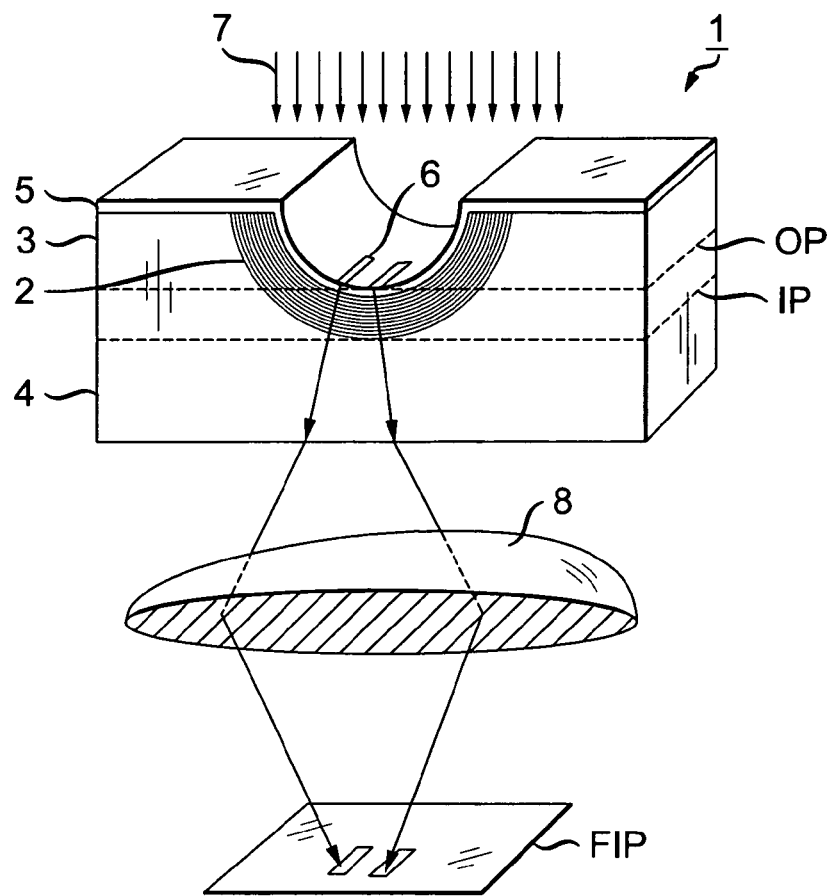

Recently a so-called hyperlens has been demonstrated in Z. Liu et al.: "*Far-Field Optical Hyperlens Magnifying Sub-Diffraction-Limited Objects*", Science 315 (2007), p. 1686. The principle of this hyperlens 1 is shown in FIG. 1. A curved periodic stack 2 of 16 layers of Ag (35 nm) and $Al_2O_3$ (35 nm) is arranged on a half-cylindrical cavity 3 formed on a quartz substrate 4. A 50 nm chrome layer 5 is located on the periodic stack 2. An image 6 in an object plane OP, which consists of metallic stripes 2 on the chrome layer 3, is illuminated with a laser beam 7 from the side of the chrome layer 5. The periodic stack 2 of the hyperlens 1 generates a magnified image of the sub-diffraction limited image 6 in an image plane IP of the hyperlens 1. This magnified image is then imaged with a conventional lens 8 into a far-field image plane FIP. In the figure a cut through the lens 8 is depicted. With this approach a sub-diffraction resolution imaging of 40 nm wide stripes was achieved with a reading wavelength of 365 nm. The periodic stack 2 of the hyperlens 1 magnifies an object by transforming scattered evanescent waves into propagating waves.

The design of the hyperlens 1 is also explained in H. Lee et al.: "*Development of optical hyperlens for imaging below the diffraction limit*", Opt. Exp. Vol. 15 (2007), pp. 15886-15891. A further report on hyperlenses has been published in Z. Jacob et al.: "*Optical Hyperlens: Far-field imaging beyond the diffraction limit*", Opt. Exp. Vol. 14 (2006), pp. 8247-8256.

It is an object of the invention to propose an optical recording medium as well as a corresponding pickup that allows to make use of the above described hyperlens for optical data storage.

In accordance with the invention, an optical recording medium has marks that are arranged in tracks. The tracks have a cross section with a curved shape and protrude above a surface of the optical recording medium.

Accordingly, an apparatus for reading from an optical recording medium having sub-diffraction-limited marks arranged in tracks has a light source for generating a reading light beam and a hyperlens for reading the sub-diffraction-limited marks.

The invention proposes to use a hyperlens for near-field data storage. In order to optimize readout, the proposed optical recording medium has a track shape that allows to bring the entire track surface close to the object plane of the hyperlens. Though the magnification by the hyperlens works only in the direction perpendicular to the track direction, still an increased storage capacity is achieved.

Advantageously, the hyperlens has a curved surface that is adapted to the curved cross section of the tracks. In this way it becomes possible to arrange a plurality or marks in parallel sub-tracks within one track. According to one aspect of the invention these sub-tracks are read individually, e.g. by shifting a detector relative to the hyperlens. According to another aspect of the invention, the detector is an array detector, e.g. a matrix detector, that is capable of detecting a plurality of marks in parallel. In this case some or even all sub-tracks are read simultaneously, which results in an increased data rate compared to a conventional near-field system. Furthermore, an array detector is also advantageous in case the marks are not arranged in sub-tracks, but as data pages within the tracks. Also the use of data pages allows to achieve an increased data rate compared to a conventional near-field system.

Preferably, the cross section of the tracks, and, accordingly, the curved surface of the hyperlens, have the shape of a segment of a conic section. For example, the cross section may have the shape of a semi circle or a semi ellipse, or more generally of a segment of a circle or an ellipse. The cross section may likewise have the shape of a parabola. These shapes have the advantage that the design process of the hyperlens is simplified, because they result in a regular or at least a symmetric layer structure of the hyperlens. The numerical effort, but also the manufacturing effort, is thus reduced.

Favorably, the marks are metallic structures or indentations in the tracks. As the hyperlens magnifies an object by transforming scattered evanescent waves into propagating waves, it is not necessary to provide the optical recording medium with any reflective coating. In case of indentations the optical recording medium consists of only a substrate with an embossed structure, which results in a very efficient manufacturing process. In case of metallic structures an additional manufacturing step is necessary. However, the s scattering of the evanescent waves is enhanced, which yields an improved signal quality. Of course, it is likewise possible to use other types of marks, e.g. small structures formed in or on the tracks, small areas made of a different material or having different optical properties, etc.

Figure 2:
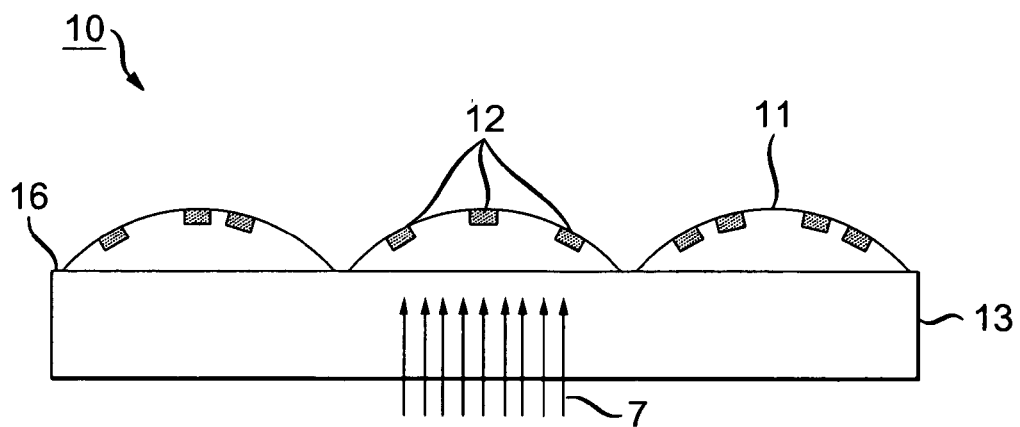
Figure 3:
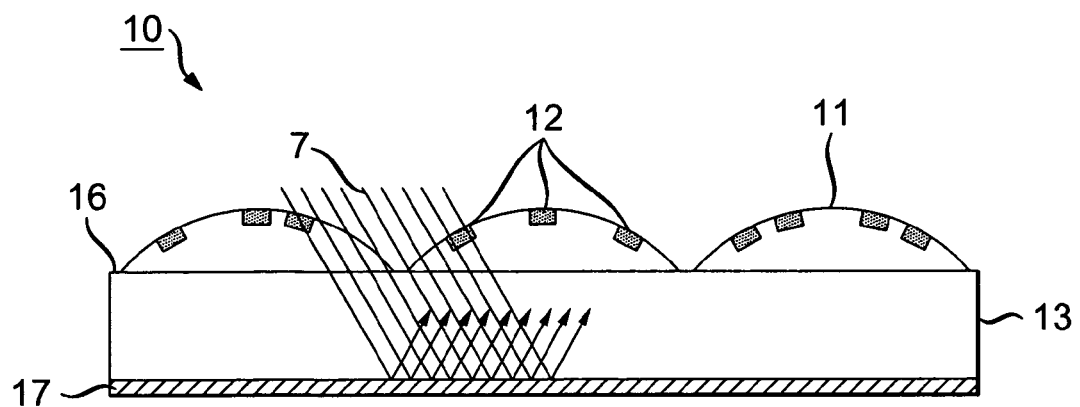
Figure 4:
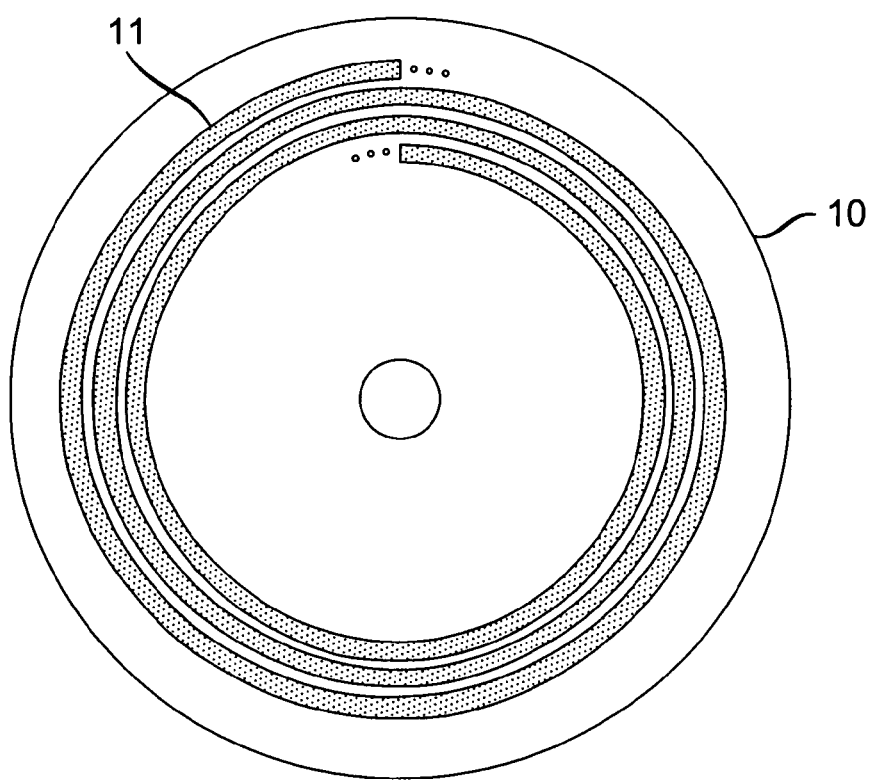
Figure 5:
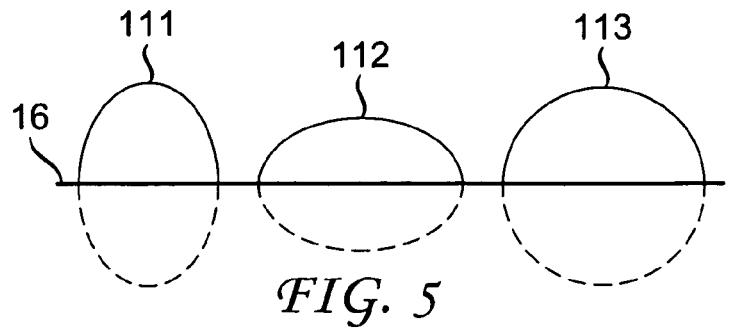
Figure 6:
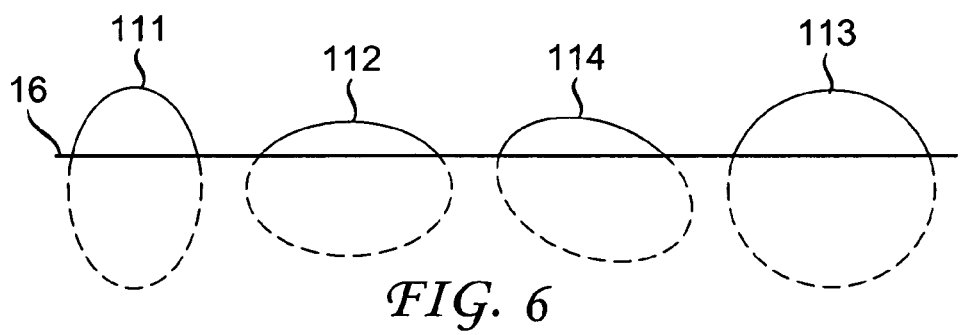
Figure 7:
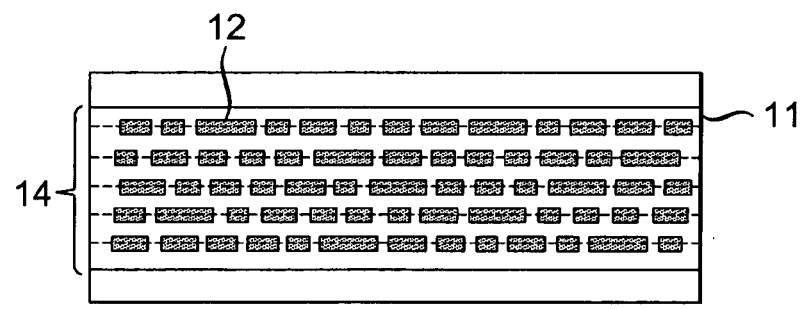
Figure 8:
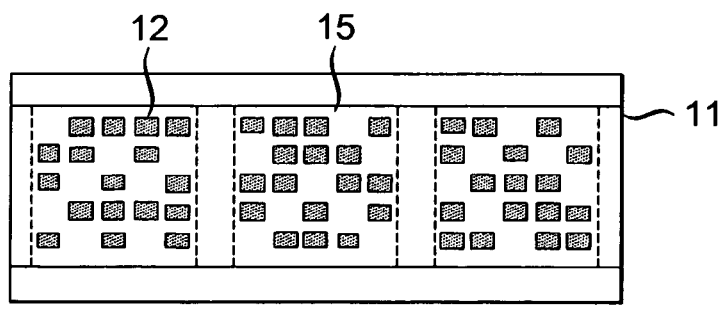
Figure 9:
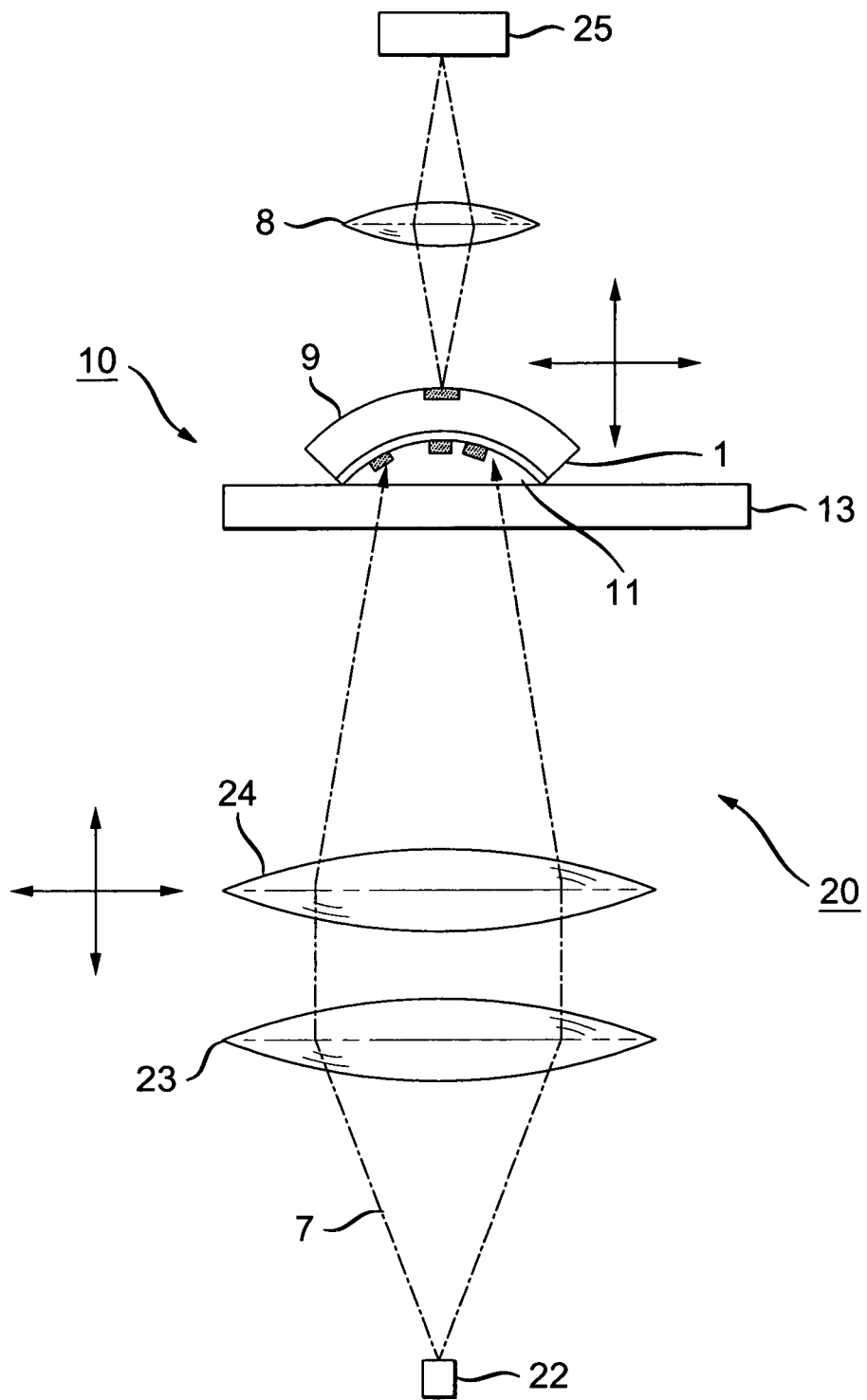

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 1 illustrates the principle of a known hyperlens,

FIG. 2 shows a side view of a first embodiment of an optical recording medium according to the invention, FIG. 3 shows a side view of a second embodiment of an optical recording medium according to the invention, FIG. 4 depicts a top view of an optical recording medium according to the invention, FIG. 5 shows a first set of possible track shapes, FIG. 6 depict a second set of possible track shapes, FIG. 7 illustrates a first arrangement of marks on the tracks of the optical recording medium of FIGS. 2 and 3, FIG. 8 depicts a second arrangement of marks on the tracks of the optical recording medium of FIGS. 2 and 3, and FIG. 9 illustrates an apparatus for reading from an optical recording medium according to the invention.

FIGS. 2 and 3 show side views of an optical recording medium 10 according to a first and a second embodiment of the invention, respectively. A top view of the optical recording medium 10 is depicted in FIG. 4. The optical recording medium 10 has tracks 11 with a cylindrical shape, which are arranged in a spiral on a substrate 13 made of, for example, polycarbonate. The tracks 11 protrude over the surface 16 of the optical recording medium 10. Arranged on the tracks 11 are a plurality of marks 12. Preferably, the marks 12 are formed by indentations (pits) in the tracks 11. Alternatively, the marks 12 are metallic structures. In the embodiment of FIG. 2 the optical recording medium 10 consists of only a molded substrate 13 including the tracks 11, which is illuminated by a light beam 7 from the bottom side of the optical recording medium 10. As the hyperlens magnifies an object by transforming scattered evanescent waves into propagating waves, it is not necessary to provide the optical recording medium 10 with any reflective coating. In the embodiment of FIG. 4 the optical recording medium 10 has a reflective layer 17, which reflects a light beam 7 irradiated from the top face of the optical recording medium 10 towards a track 11.

A first set of exemplary shapes of the tracks 11 is shown in FIG. 5. In this figure the cross section of the tracks 11 has the shape of a semi ellipse 111, 112 or a semi circle 113. The flat surface 16 of the optical recording medium 10 thus crosses the center of an imaginary ellipse or circle.

A second set of exemplary shapes of the tracks 11 is depicted in FIG. 6. In this figure the surface 16 of the optical recording medium 10 does not cross the center of an imaginary ellipse or circle. The cross section of the tracks 11 has the shape of a segment of an ellipse 111, 112, 114 or a segment of a circle 113. As can be seen, the segment of the ellipse 114 does not necessarily need to be symmetric. More generally, the cross section of the tracks 11 advantageously has the shape of a segment of a conic section.

A first arrangement of the marks 12 on the tracks 11 of the optical recording medium 10 is illustrated in FIG. 7. In this example the marks 12 are aligned along one or more sub-tracks 14. Alternatively, the marks 12 form a sequence of 2-dimensional data patterns 15, i.e. data pages. This is schematically depicted in FIG. 8. In both cases readout is preferably performed using an array detector. The array detector simultaneously detects a parallel array of marks, which leads to an increase of the data rate. Of course, it is likewise possible to scan each sub-track 14 in a dedicated reading pass. In this case it is not necessary to provide an array detector. Alternatively, only some of the sub-tracks 14 are scanned simultaneously. In both cases multiple reading operations are necessary to retrieve the complete data of a track 11.

An apparatus 20 for reading from an optical recording medium 10 according to the invention is schematically illustrated in FIG. 9. A light beam 7 of a laser diode 22 is collimated by a lens 23 and is focused by a first objective lens 24 through the substrate 13 of the optical recording medium 10 onto a track 11. Of course, in case of the optical recording medium 10 of FIG. 3 the light beam is irradiated from the top face of the optical recording medium 10 and illuminates the track 11 after reflection by the reflective layer 17. The sub-wavelength sized marks 12 on the track 11 of the optical recording medium 10 scatter the light beam 7 and create near field evanescent waves. These evanescent waves are magnified with a hyperlens 1 and generate a magnified image of the marks 12 on the top surface 9 of the hyperlens 1. In other words, the hyperlens 1 converts the non-propagating evanescent waves into propagating waves during their propagation to the surface 9 of the hyperlens 1. The magnified images of the marks 12 are imaged with a second objective lens 8 onto an array detector 25. The array detector 25 simultaneously detects a parallel array of marks 12, which allows to achieve an increased data rate. The hyperlens 1 is mounted on an actuator (not shown) and kept at a distance of around 20 nm from the surface of the optical recording medium 10. This distance is comparable to conventional near-field optical recording systems. However, it is not necessary to mount the second objective lens 8 on an actuator provided that the vertical run-out of the optical recording medium 10 is kept sufficiently low, e.g. below 50 μm. Preferably, the first objective lens 24 is a conventional objective lens for pickups and is mounted on a conventional actuator (not shown). This is advantageous since the hyperlens 1 magnifies only in a radial direction. Consequently, correct focusing needs to be ensured. The resolution in the tangential direction is determined by the spot size achieved with the first objective lens 24.

The invention claimed is:

1. An optical recording medium comprising:
   a flat substrate; and
   a track arranged on the flat substrate, which forms a continuous spiral and protrudes above a surface of the flat substrate; wherein
   the track has a cross section with a curves shape, a curvature of the track being perpendicular to a track direction; and wherein
   the track comprises marks formed by metallic structures or indentations in a curved surface of the track and being adapted to generate scattered evanescent wave upon illumination with a light beam, a width of the marks being smaller than a width of the track.

2. The optical recording medium according to claim 1, wherein the cross section of the track has the shape of a segment of a conic section.

3. The optical recording medium according to claim 1, wherein the marks are arranged in two or more sub-tracks within the track.

4. The optical recording medium according to claim 1, wherein the marks are arranged as data pages within the track.

5. The optical recording medium according to claim 1, wherein the optical recording medium consists of only a substrate without any reflective layer.

6. The optical recording medium according to claim 2, wherein the marks are arranged in two or more sub-tracks within the track.

7. The optical recording medium according to claim 2, wherein the marks are arranged as data pages within the track.

8. The optical recording medium according to claim 2, wherein the optical recording medium consists of only a substrate without any reflective layer.

9. The optical recording medium according to claim 3, wherein the optical recording medium consists of only a substrate without any reflective layer.

10. The optical recording medium according to claim 4, wherein the optical recording medium consists of only a substrate without any reflective layer.

* * * * *